United States Patent [19]

Stevens

[11] Patent Number: 4,892,714
[45] Date of Patent: Jan. 9, 1990

[54] RECRYSTALLIZATION APPARATUS

[75] Inventor: Robert L. Stevens, South Harpswell, Me.

[73] Assignee: Microscale Organic Laboratory Corporation, Newcastle, N.H.

[21] Appl. No.: 257,209

[22] Filed: Oct. 13, 1988

[51] Int. Cl.⁴ .............................................. B01D 35/00
[52] U.S. Cl. .................................. 422/245; 210/515; 210/518; 210/774
[58] Field of Search ...................... 210/348, 360.1, 369, 210/781, 782, 508, 514, 515, 516, 517, 518, 774; 422/245, 99, 102

[56] References Cited

U.S. PATENT DOCUMENTS

| | | | |
|---|---|---|---|
| 3,879,295 | 4/1975 | Glover et al. | 210/516 |
| 3,897,343 | 7/1975 | Ayres | 210/516 |
| 4,364,832 | 12/1982 | Ballies | 210/518 |
| 4,707,276 | 11/1987 | Dodge et al. | 210/516 |

Primary Examiner—David L. Lacey
Assistant Examiner—Gregory R. Muir
Attorney, Agent, or Firm—Thomas N. Tarrant

[57] ABSTRACT

Small scale recrystallization apparatus is described using a container tube and a plastic plug with the end of the plug and a constriction in the tube mismating in a precisely controlled ellipticity of one so as to allow passage of solution while blocking formed crystals.

4 Claims, 2 Drawing Sheets

RECRYSTALLIZATION APPARATUS

BACKGROUND OF THE INVENTION

1. Field of the Invention

The present invention relates to apparatuse for determining solubility and small-scale recrystallization and particularly to such apparatus used for separating crystals from solution.

2. Relation to the Prior Art

Apparatus for small scale recrystallization is described in *IND. ENG. CHEM. ANAL. ED.* 16 PP 413-414 (1944). "*Improved Apparatus for Solubility Determination or for Small-Scale Recrystallization,* by Lyman Craig and Otto Post. A glass plug fitted against a constricted neck of a glass vial blocks the crystal while passing solution thus separating crystals from solution. Where fine crystals are involved, the glass is ground for a closer though still leaky fit.

More recently plastic has been utilized, by those skilled in the art, to replace the more expensive and breakable glass in making the plugs. The plastic, being softer, is not easily molded or roughened to provide a controlled leaky interface with the glass.

SUMMARY OF THE INVENTION

In accordance with the present invention, recrystallization apparatus is provided wherein a plastic plug fitting against a constriction in a tubular container is made with a distorted conical nose such that a leaky interface is effected in proportion to the amount of distortion.

Further objects and features of the invention will be understood upon reading the following description together with the drawing.

DESCRIPTION OF THE PREFERRED EMBODIMENTS

Figure 1:
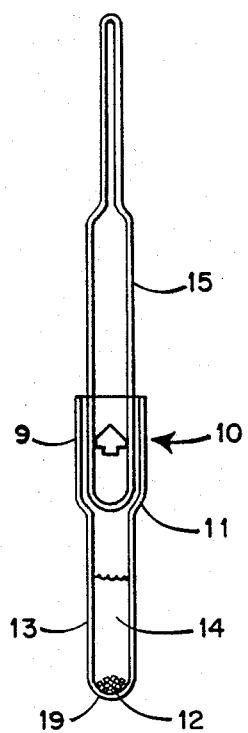
FIG. 1 is a front elevation of separation apparatus according to the invention containing crystals and a solvent solution.

FIG. 1 depicts tube 10, a tubular glass container with a contricted bottom portion 11. Tube 10 contains crystalline material 12 in solvent liquid 14. In exemplary operation, crystalline material is placed in tube 10, solvent is added and then the tube 10 is heated. When all or most of the crystalline material has dissolved, the solution is cooled until the crystals reform.

Figure 2:
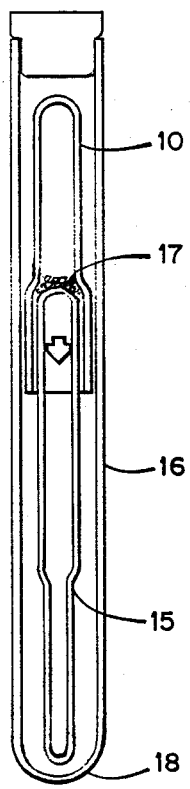
FIG. 2 is a front elevation of separation apparatus according to the invention inverted in a centrifuge tube.

After recrystallization has taken place, plug 15 is inserted in tube 10 and then the assembly of 10 and 15 is inverted and placed in centrifuge tube 16 (FIG. 2). Tube 16 is spun in a centrifuge driving the new crystal up against nose end 17 of plug 15 and solution 14 on past to bottom 18 of tube 16.

After centrifuging, the assembly 10, 15 is removed from tube 16 and plug 15 is removed from tube 10. New crystal resulting from recrystallization is then removed from nose end 17 of plug 15.

Figure 3:
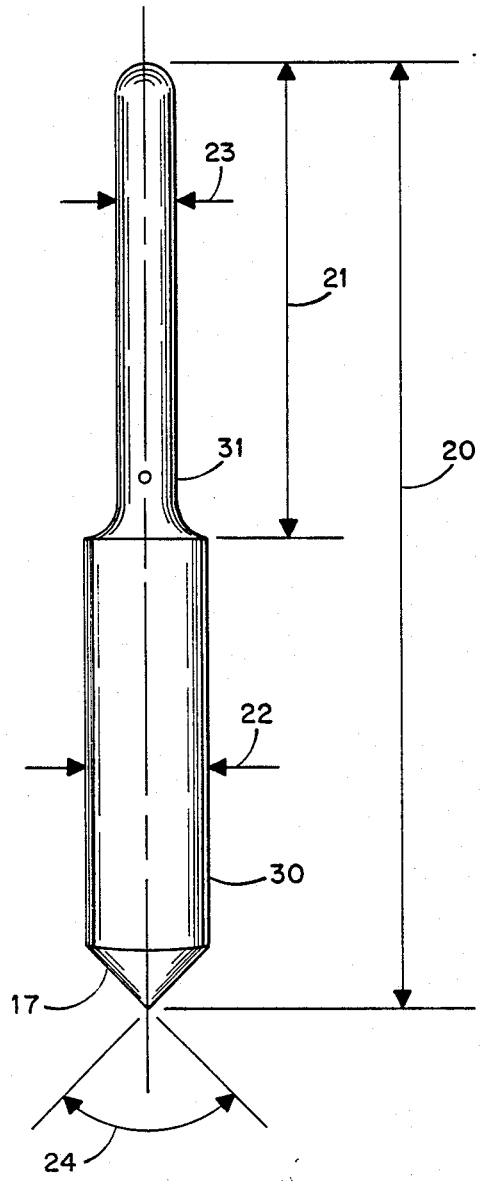
FIG. 3 is an enlarged front elevation of plug 15 of FIG. 1.

While in the past, plug 15 was commonly made from glass, in accordance with the invention it is made of plastic. FIG. 3 depicts a plug made from polytetrafluoroethylene. When the polytetrafluoroethylene is molded symmetrically, it fits too tightly against constriction 11 and the solution does not pass. In the case of glass, this has been overcome by rough grinding of the glass. Rough grinding of the polytetrafluoroethylene does not work as well as with glass. Even when it allows the solution to pass, it becomes difficult to remove recrystallized material.

Plug 15 of FIG. 3 has nose end 17 formed as an elliptical cone so as to prevent it from fitting too snugly against constriction 11. The term elliptical cone as used herein is intended to define a generally conical shape in which cross sections through the axis of the cone are elliptical and not circular.

While size is not critical, the invention has been made for purposes of microscale organic chemistry research and the following dimensions are given as exemplary for that purpose. Length 20 of plug 15 is 8 cm. Plug 15 has large diameter portion 30 ending in nose end 17. Small diameter portion 31 serves as a handle. Length 21 of small diameter portion 31 is 4 cm. Large diameter portion 30 has diameter 22 of 1 cm for a close easy fit in tube 10. Diameter 23 of small diameter portion 31 is 0.475 cm. The angle 24 of nose end 17 is 90°.

The inside diameter of tube 10 at open upper portion 9 is 1.05 cm and constriction 11 reduces it to 0.8 cm which continues through lower portion 13 to closed end 19.

The difference between diameter 22 of plug 15 and the inside diameter of upper portion 9 of tube 10 is preferably 0.05 cm ±0.02 cm. With smaller spacing, plug 15 is likely to get stuck while larger spacing allows a tilt changing the amount of leak at constriction 11.

Figure 4:
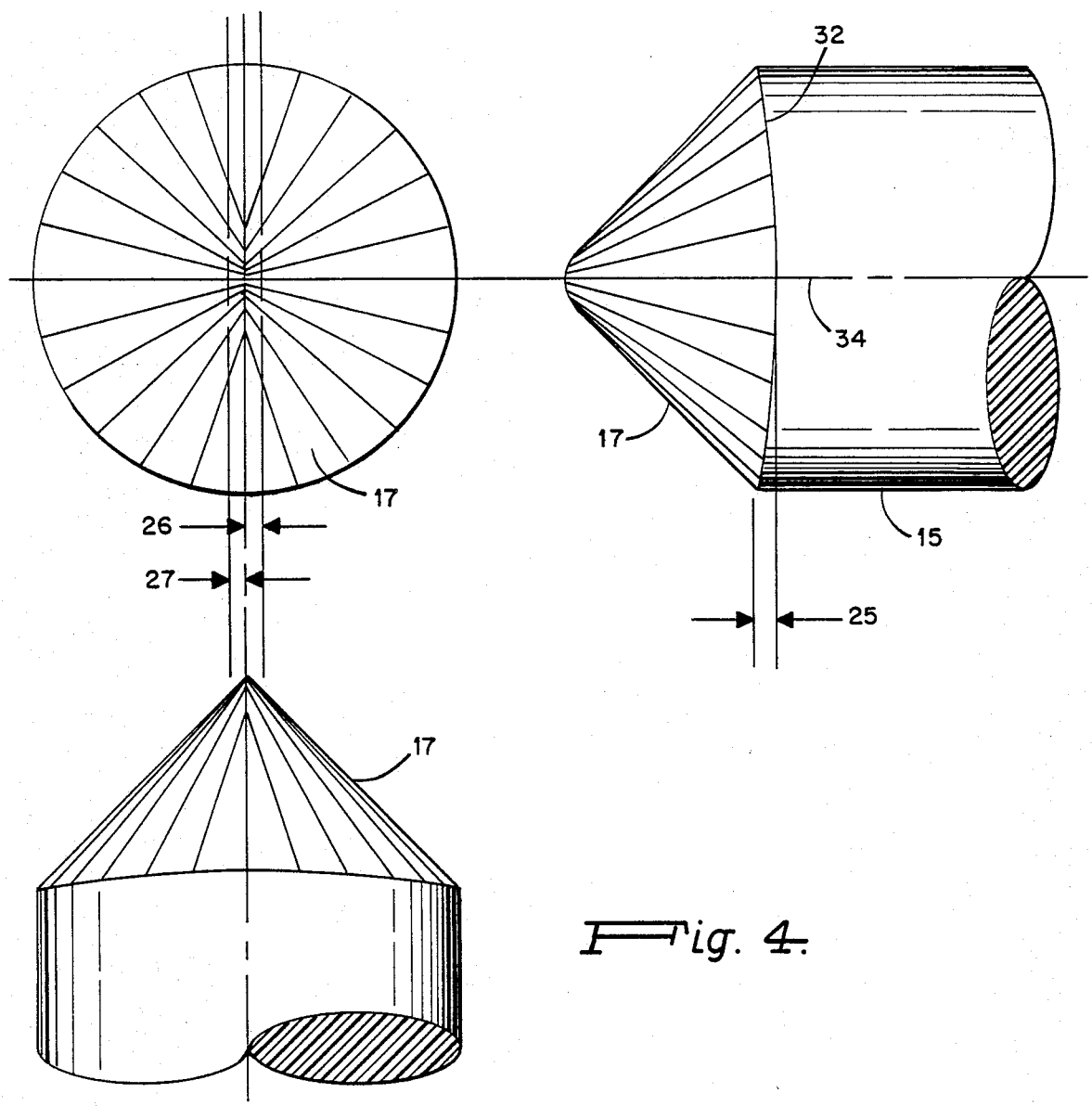
FIG. 4 is an enlarged detail of nose end 17 of plug 15 giving bottom plan and two 90° rotated side views interrelated by axis lines in one figure.

FIG. 4 details exemplary ellipticity of nose end 17. With constriction 11 of tube 10 circular, slight ellipticity in nose end 17 provides the necessary leakage. The amount of ellipticity has to be related to the size of the crystals. With very small crystals it is necessary to have very little ellipticity making the leakage slow and the process lengthy. Where the crystals are large, more leakage can be allowed, speeding up the process.

In FIG. 4, baseline 32 is the base of a cone forming nose end 17. Plug 15 is nominally a cylinder with cylindrical axis 34. The amount of ellipticity in nose end 17 is usually reflected in the extent baseline 32 deviates from a plane normal to axis 34. In the exemplary case, deviation 25 in baseline 32 is 0.043 cm. Using an endmill, the cutting tool is rotated while the workpiece (plug 15) is oscillated back and forth 0.043 cm from center.

It is also possible to oscillate the work product or cutting tool toward and away from each other during rotation of the cutting tool to achieve the same purpose.

Assuming that the workpiece is moved laterally with respect to the cutting tool, dimensions 26 and 27 indicate the amount of offset of the workpiece from the rotational axis of the cutting tools at the extremes of offset. In FIG. 4 dimensions 26 and 27 are each 0.03 cm the same as the baseline deviation.

While a specific preferred embodiment has been described, obvious variations include precision molding of the plastic rather than machining, distortion of constriction 11 instead of nose end 17, distortions other than elliptical and ovoid, spherical or other similar shapes for nose end 17 rather than conical.

I claim:

1. Recrystallization apparatus comprising:
   a. A tube having an upper portion joined by a constriction to a closed bottom portion of said tube;
   b. a plug of plastic material fitting inside said upper portion and having a nose end too large to pass said constriction;
   wherein one of said nose end and said constriction is circular in cross-section while the other is noncircular so as to provide an open area between said nose end and said constriction which is of the size that allows passage of liquid while blocking passage of crystals therethrough.

2. Recrystallization apparatus according to claim 1 wherein said other is elliptical in cross section.

3. Recrystallization apparatus according to claim 2 wherein said other is said nose end.

4. Recrystallization apparatus according to claim 1 wherein said plug is made of polytetrafluoroethylene and said nose end is shaped as an elliptical cone.

* * * * *